United States Patent [19]

Lampert et al.

[11] 4,152,651
[45] May 1, 1979

[54] METHOD FOR DETECTING THE CODE-PHASE COINCIDENCE IN AN SSMA RECEIVER

[75] Inventors: Ernst Lampert, Unterpfaffenhofen; Helmut Mahner, Munich, both of Fed. Rep. of Germany

[73] Assignee: Siemens Aktiengesellschaft, Berlin & Munich, Fed. Rep. of Germany

[21] Appl. No.: 184,240

[22] Filed: Sep. 27, 1971

[30] Foreign Application Priority Data

Sep. 30, 1970 [DE] Fed. Rep. of Germany ....... 2048055

[51] Int. Cl.² .............................................. H04B 1/10
[52] U.S. Cl. ..................... 325/419; 325/58; 178/69.1
[58] Field of Search .................. 325/32, 345, 408, 58, 325/42, 419; 329/50, 122, 134; 328/133; 178/69.5 R, 69.1

[56] References Cited

U.S. PATENT DOCUMENTS

| 3,311,442 | 3/1967 | Jager et al. .............................. 325/42 |
| 3,402,265 | 9/1968 | Couvillon ............................. 178/69.5 |
| 3,646,252 | 2/1972 | Verstraelen et al. ................... 329/50 |

*Primary Examiner*—Howard A. Birmiel
*Attorney, Agent, or Firm*—Hill, Gross, Simpson, Van Santen, Steadman, Chiara & Simpson

[57] ABSTRACT

A method for detecting the coincidence between the phase position of a code of an SSMA signal which has been received with a heterodyne receiver and the code which is produced in the receiver through means for evaluating the signal power increase in an intermediate frequency position when the correct phase position occurs.

11 Claims, 4 Drawing Figures

INVENTORS
Ernst Lampert
Helmut Mahner

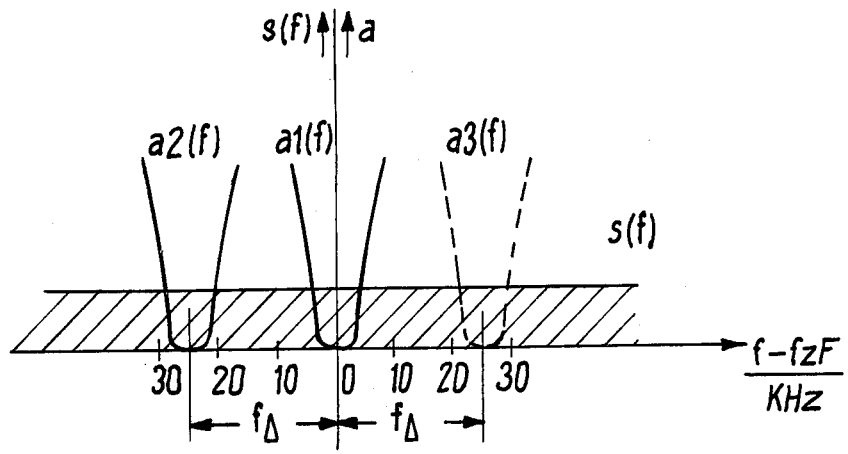
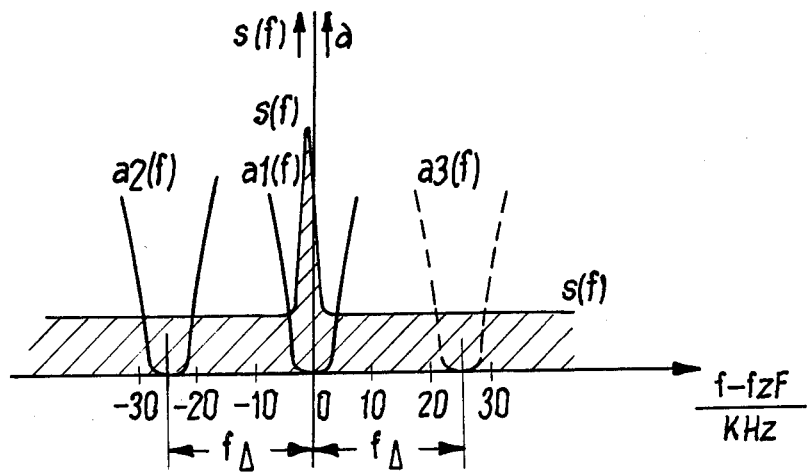

METHOD FOR DETECTING THE CODE-PHASE COINCIDENCE IN AN SSMA RECEIVER

DESCRIPTION

The SSMA technique is a transmission method in which the information itself is artificially spread in the frequency band and the given radio frequency range is utilized by several stations simultaneously for transmission purposes. The expression "SSMA" is derived from the term "Spread-Spectrum-Multiple-Access Modulation". The SSMA method is applied primarily with satellite transmission as having multiple access. This technique is described in detail, for instance, in the publication "Proceedings of the IEEE", volume 54, 1966, pp. 763-777. An essential feature of the SSMA technique is that a fairly large number of transmitting stations operate in the same radio frequency range and that the symbols which are transmitted by the individual stations, respectively, have their own particular characterizing code modulation. This code modulation has two objectives, namely, to expand the individual signal over a larger frequency range and to make the signal recognizable as a code symbol for a certain receiving station. Therefore, it becomes possible, with regard to the individual receiver, to detect a certain transmitting station, on the basis of its code symbol from the received frequency spectrum. The code symbol of the individual station is therefore a relatively long symbol which includes, for example, 10 mega bits. The individual symbol is most often expressed by a phase change of the transmitted high frequency oscillations with respect to the respectively preceding bit. The information itself is impressed onto code symbol, in addition, by means of applying rapid phase change modulation in such a way that the code symbol which includes relatively many bits is inverted in its phase with respect to essentially fewer bits when a sign change occurs in the information flow. The code signal is produced on the receiving side in a code signal generator which runs synchronously with the transmitting side, and is submitted to a multiplying process in the radio frequency position or, as is most usually the case, in the intermediate frequency position. Due to the multiplication process, the signal power will only appear in the form of a single individual spectrum line, when the code received has not been changed by any additional information. If the code signal is changed on the transmitting side by means of inverting individual phase changes in the rhythm of the information which, compared with the code signal, only contains few bits, an information signal will be obtained of the individual frequency component when the unchanged code signal is received, which information comprises all of those frequency components which correspond to the information on the transmitting side. Therefore, devices for producing a phase modulated electrical oscillation are required in systems which employ the SSMA technique both on the transmitting side and on the receiving side.

An essential problem with such devices, however is that the code signal which is produced in the receiver must be phase synchronous with the code signal which is recovered in the receiver and which belongs to the desired transmitting station. The fact that with a correct position the output power of the multiplier increases strongly is utilized as a recognition criterion for this phase position with prior SSMA receivers. For this purpose, a threshold value circuit is provided with such receivers at the output of the multiplier which, when a constant threshold value is exceeded by the output signal, takes on the correct synchronization. This embodiment of an SSMA receiver, however, has the important drawback that it is extremely dependent on level fluctuations of the input signal and, thus, also strongly dependent on the traffic load of the radio frequency range in which the individual stations operate.

The present invention has as its primary objective the task of improving an SSMA receiver with respect to the aforementioned difficulty.

This objective is achieved through a method for detecting the coincidence between the phase position of the code of an SSMA signal which has been received by a heterodyne receiver and the code produced in the receiver by means of evaluating the signal power increase in an intermediate frequency position when the correct phase position appears. This is accomplished, according to the present invention, in such a way that a signal portion with a band width of about twice the bit rate of the base band information is taken from the intermediate frequency signal at the desired frequency. Furthermore, at least one signal portion whose frequency is outside of the band is taken from the essentially broader intermediate frequency signal, preferably with about the same band width, and the criterion for correct phase position is derived from a power comparison of these two signal portions.

In an advantageous further development of the invention this method is characterized in that two signal portions, whose frequencies are outside of the desired frequency range, are taken from the intermediate signal, and lie symmetrically above and below the desired frequency range and have about the same band width.

An advantageous circuit for executing a method according to this invention is characterized in that two band filters are provided to receive the intermediate frequency signal, one of which filters is tuned to the desired frequency range and the other of which is tuned to a frequency range which, within the frequency range which is covered by the intermediate signal, is outside of the desired frequency range. Rectifiers, particularly those with a squared characteristic, are connected to the two band filters whose outputs are preferably connected to a difference forming circuit, preferably with intersecting low pass filters, and the output of the difference forming circuit is connected with a sign evaluation circuit which, when a given power portion is reached compared with the other frequency range in the desired frequency range, emits a signal as criterion for the correct phase position.

An advantageous further development of this circuit consists in providing a modulator in the place of the band filter for the frequency area outside of the desired frequency range, which modulator obtains a signal as a switching voltage having a frequency corresponding to the difference value between the center frequency of the desired frequency range and the frequency range which is frequency-shifted with respect thereto, and that a band filter is inserted between this modulator and the rectifier which lies in this transmission path, and such is tuned to the desired frequency range and has preferably the same band width as the desired frequency filter.

Accordingly, it is advantageous to provide such an embodiment wherein a level adjusting device is inserted in the transmission path for the signal portion which is positioned outside the desired frequency range.

It is furthermore recommended to embody the foregoing type of circuit in such a way that the low-pass filter in the transmission path is designed changeably in the band width for the desired frequency range, in such a way that its rise time can be essentially changed and that an adjustment of this low-filter is provided in such a way that the band width corresponds to that of the low-pass filter in the other transmission path when the code has correct mutual phase position. Further, in another case of operation, the band width is essentially larger and, thus, the build-up time essentially shorter.

It is furthermore advantageous with such a circuit, when an indicating device for determining the given noise level, preferably with respect to the level of the useful signal, is connected to the rectifier output in the transmission path for the frequency range outside of the desired frequency range.

Other objects, features and advantages of the invention, its organization, construction and operation will be best understood from the following detailed description of preferred embodiments thereof taken in conjunction with the accompanying drawing, in which:

FIG. 3 is a graphical illustration of a first circuit for deriving a control signal from the synchronous demodulator; and FIG. 4 is a further graphical illustration of another circuit for deriving the control signal from a synchronous demodulator.

Figure 1:
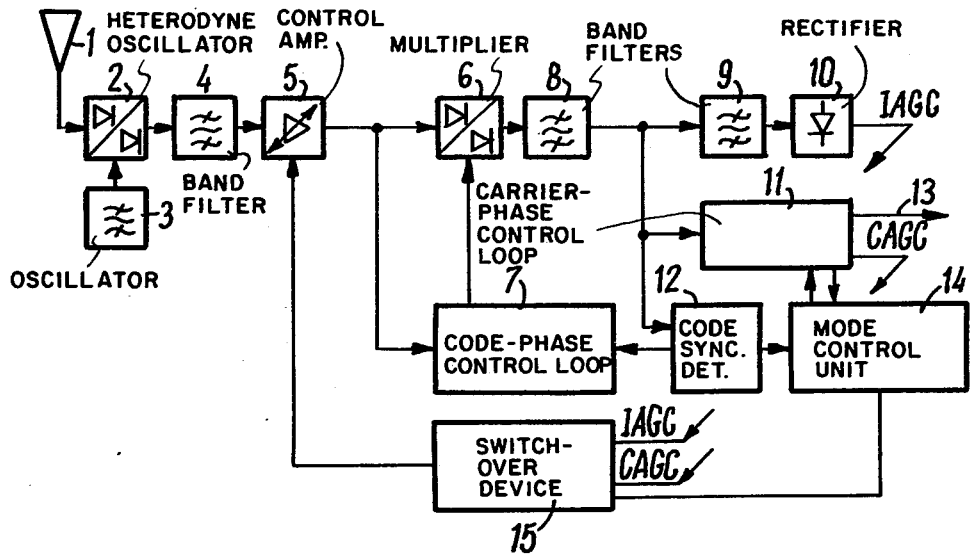
FIG. 1 is a schematic block diagram of a receiver constructed in accordance with the principles of the present invention.

With a receiver according to FIG. 1, the radio frequency signal is received by way of an antenna 1, and it covers, for instance, a frequency range of 7250–7270 MHz. The received radio frequency signal is applied to a heterodyne oscillator 2 which obtains a heterodyne oscillation with a frequency of 7190 MHz from an oscillator 3. The intermediate frequency signal at a frequency of 70 MHz±±10 MHz is taken at the output of the heterodyne oscillator 2 by way of a band filter 4 and extended to a control amplifier 5, which amplifier is also commonly known by such terms as a regulating amplifier, adjusting amplifier, etc. The intermediate frequency signals are taken from the output of the control amplifier 5 applied to a multiplier 6 on the one hand and to a subsequent code-phase control loop 7 on the other hand. In the subsequent code-phase control loop 7, the code of the transmitting station which is to be received is simultaneously produced and modulated onto a carrier signal which is applied to multiplier 6. This carrier signal is extended from a circuit 7 and is frequency-different from the intermediate-frequency signal at the other input of the multiplier 6 in such a way that a second intermediate-frequency results at the output of the multiplier 6, for example, in the frequency position around 20 MHz. The useful signal which appears during the multiplication process in the multiplier 6 is screened out with the aid of a band filter 8, which has a band width that is small compared to the band width determined by the bit succession frequency of the information itself. In a sample embodiment heretofore constructed, the band width of the band filter 8 was about 60 kHz. A further band filter 9 follows the band filter 8 and has a band width which is again essentially less and which lies about in the order of magnitudes of the double bit rate of the information to be evaluated. In the afore mentioned sample embodiment, the band width of this filter was between 1 kHz and 10 kHz. This band width may be varied according to particular demands. A rectifier 10 is fed from the band filter 9 and is operable to provide one of the two initially mentioned control signals as an output direct current signal.

The just mentioned control signal has been referenced IAGC. A subsequent carrier-phase control circuit 11 and a circuit 12 for detecting the code synchronization are connected parallel to the band filter 9 and to the output of the band filter 8. The control circuit 11 contains a demodulator in the form of a so-called synchronous demodulator. Accordingly, the information which is to be obtained from the receive signal is available at the output 13. A mode control unit is also supplied by the control circuit 11 which is also fed by the circuit 12 for the detection of code synchronization. This mode control unit 14, on the one hand, feeds the control circuit 11 and, on the other hand, causes operation of a switch-over device 15 to supply the respectively correct one of the two control voltages to the control amplifier 5. The control magnitude or gain control signal IAGC, on the one hand, and the control magnitude or gain control signal CAGC, on the other hand, are supplied to the switch-over device 15 and the switch-over device 15 operates to connect the respective control signals IAGC and CAGC when synchronization is present, or missing, respectively, as determined by the mode control unit 14.

The switch-over device 15 may also contain additional circuit elements for influencing control behavior. In this respect, it has primarily been considered to provide the circuit 15 with an integral regulator.

Figure 2:
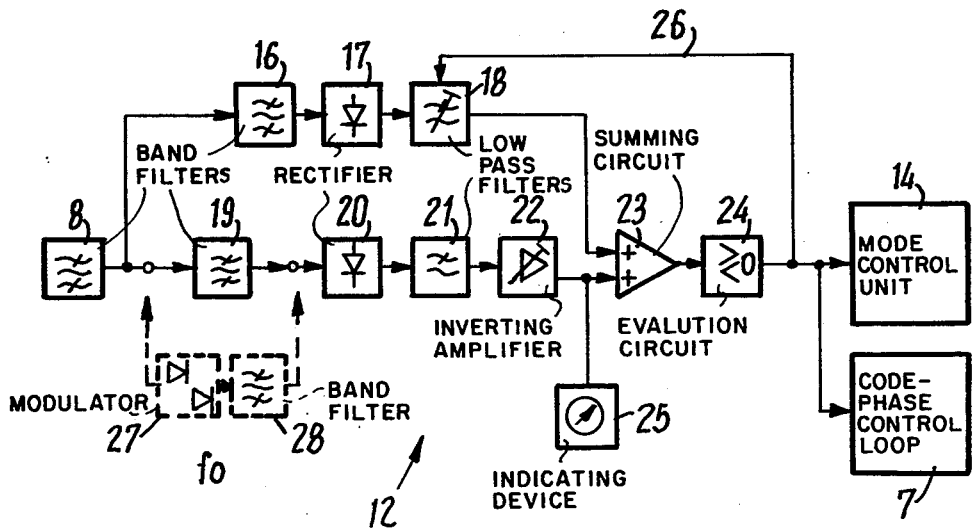
FIG. 2 is a circuit block diagram of a synchronous demodulator.

In FIG. 2, a circuit according to the present invention for recognizing the code-phase coincidence independently of signal level has been shown as provided in an operation system constructed according to the sample embodiment. With the help of this circuit, the method of the present invention will also be further explained along with its further development.

In FIG. 2, the band filter 8 of FIG. 1, along with the circuits 7 and 14 have been shown in order to illustrate their connections. The entire circuit according to FIG. 2, as far as it does not include the circuits 7, 8 and 14, therefore corresponds to the circuit 12 of FIG. 1. The intermediate frequency signal is taken from the output of the band filter and applied to the band filters 16, 19 which are positioned in parallel transmission paths. A pair of rectifiers 17, 20 follow respective wants of the band filters 16, 19 and are preferably square law rectifiers whose outputs are connected to low-pass filters 18, 21. The outputs of the band filters 18 and 21 are connected with a summation circuit 23, a inverting amplifier 22 being provided between the filter 21 and the summation circuit 23. The inverting amplifier 22 and the summation circuit 23 operate as a difference forming circuit due to the insertion of sign reversal by the circuit 22. An evaluation circuit 24 is fed by the circuit 23 for evaluating the sign of the output signal of the summation circuit 23 and emits the sign for code-phase coincidence with a positive output signal of the summation circuit 23, namely to the mode control unit 14 and the code-phase control loop 7. In addition, the control loop for the band width of one of the two low-pass filters is provided, namely for that of the low-pass filter 18. This control loop has been referenced 26 and is utilized for controlling the characteristic of the filter 18.

The mode of operation of this circuit can be envisioned as follows:

An intermediate frequency signal with a relatively large band width is offered at the output of the band filter 8. The band filter 16 is relatively narrow in its band width compared with the band width of the intermediate frequency signal received from the filter 8 and it coincides in its average or center frequency at least approximately with the frequency value of the carrier of the useful signal in the intermediae frequency signal. The band filter 19 has about the same band width as the band filter 16, but is positioned at a different frequency with respect to its pass band within the band width of the intermediate frequency signal. The distribution of the frequencies and the band width conditions can be recognized in FIG. 3.

In FIG. 3, a diagram is shown which illustrates the course of the transmission attenuation $a_1(\omega)$ and $a_2(\omega)$ of the filters 16 and 19. In addition to the frequency of the useful signal $f_{ZF}$, the frequency deviation according to positive and negative values has also been shown on the abcissa, for instance in kHz. It is therefore assumed that the intermediate frequency signal at the output of the filter 8 covers the frequency band of $\pm 50$ kHz. The curve $a_3(\omega)$ which has been illustrated by broken lines in FIG. 3 includes the case of the circuit alternative 26, 27 and is valid for the entire passage ranges among themselves. This circuit alternative will be discussed below in greater detail.

If, however, when phase coincidence occurs with respect to the code, a strong increase of the power density will occur in the range of the useful signal. This can be seen in FIG. 4 which represents the case of phase coincidence and, thus, the case of the occurrence of the useful signal. The useful signal occurs only in the frequency range which is assigned to the band filter with the average frequency $f_{ZF}$. From this it can be seen that the powers in the output of the individual filters 16 and 19 become markedly different upon the occurrence of a useful signal. By means of rectifying the outputs of the filters 16 and 19, corresponding direct current voltages are obtained and made available for further evaluation. Since, due to the definite band width such rectification, interfering components may contribute to the direct current voltage in addition to the useful signal, and therefore impress undesired fluctuations onto the direct current voltage level. A low-pass filter has therefore been provided for each of the filters with a relatively small band width, such as 5 Hz with a corresponding long rise time. The direct current voltages which are available at the outputs of the two low-pass filters are summed, by means of a sign-reversing process in the circuit 22, opposite to and by means of the summation circuit 23. For the case wherein the useful signal is missing, the output signal will be 0 at the output of the evaluation circuit 24 in the case of a single filter 19 and a single filter 16 as long as no phase correct code synchronization 0 phase coincidence is given for the code. In the case of phase coincidence with respect to the code, however, a positive output signal is obtained at the output of the evaluation circuit 24.

This circuit is independent from fluctuations of the level of the intermediate frequency signal since for the 0 criterion for both transmission branches, the transmission branch 16-18 and the transmission branch 18-22 are each loaded with the same signal which contains fluctuations, and only the difference in one of the two transmission paths is applied for obtaining the phase-coincidence criterion.

In place of the band filter 19, a band filter 28, which is similar to the band filter 16, may be utilized if, according to a further development of the invention, a modulator 27 is connected ahead of the band filter 28. The modulator 27 obtains an oscillator signal for heterodyning which corresponds to the desired shifted frequency $f_\Delta$ (see FIG. 3). If the pass band of band filter 28 is selected equal to that of the band filter 16, this selection of the frequency transformation causes the modulator 27 to transmit two partial frequency ranges which are positioned, frequency-wise, symmetrically to the pass range of the band filter 16 and thus to the average $f_{ZF}$. Therefore, equal band filters may be utilized, which is of an advantage in purchasing and/or production.

The low-pass filter 18 should have as small a band width as possible at code-phase coincidence, which is, of course, connected with a correspondingly long rise time. With the preceding embodiments, a compromise value has been assumed for this band width. According to another development of the invention, however, it is possible to design this band width condition at an optimum for the operational behavior in such a way that the band filter 18 designed so that it can be switched over in its band width or so that it is designed for changeability. The criterion for this switching over and/or change of the band width can be taken from the evaluation circuit 24 by lowering the band width in the low-pass filter 18 correspondingly when the sign value of the output signal occurs, which sign indicates a useful signal, control for adjustment being effected by means of the control loop 26.

The circuit which is illustrated in FIG. 2, has the additional advantage that the signal magnitude which is provided in the transmission path 20, 21 can also be applied simultaneously for the direct indication of the ratio of useful signal and interfering signal. For this purpose, an indicating device 25, such as a meter designed as a logarithmic indicator, is connected to the output of the sign reversing circuit 22 so that an output is obtained directly in a decibel reading.

Although we have described our invention by reference to illustrative embodiments thereof, many changes and modifications may become apparent to those skilled in the art without departing from the spirit and scope of our invention, and it is to be understood that we intend to include within the patent warranted hereon all such changes and modifications as may reasonably and properly be included within the scope of our contribution to the art.

What we claim is:

1. A method for detecting the coincidence between the phase position of the code of an SSMA signal which is received with a heterodyne receiver and code which produced in the receiver through an evaluation of the signal power increase in an intermediate frequency position when correct phase position occurs, comprising the steps of:

receiving from a broader intermediate frequency signal at a desired frequency a signal portion with a band width of about twice the value of the base band information band width, receiving at least one signal portion which is outside the desired frequency range and of the same band width from a broader intermediate frequency signal, and comparing the power of these two signal portions to determine the correct phase position.

2. The method set forth in claim 1, comprising the steps of receiving a third signal portion positioned outside of the desired frequency range from the intermediate frequency signal, said second and third signal portions positioned above and below the desired frequency range, respectively, and having equal band widths, and the step of comparing is further defined as comparing the first mentioned signal portion with the second or third signal portion received.

3. Apparatus for detecting the coincidence between the phase position of a code of an SSMA signal which is received with a heterodyne receiver and a code which is produced in the receiver through an evaluation of the signal power increase in an intermediate frequency position when the correct phase position occurs, comprising:

means for receiving from the intermediate frequency signal at a desired frequency a first signal portion transmitted as information with a band width of about the value of the double bit rate of the base band, means for receiving from the intermediate frequency signal at least one second signal portion of the same band width outside of the desired frequency, and means for comparing the power of said two signals to determine the phase relationship of the codes.

4. Apparatus according to claim 3 comprising a pair of band filters for receiving the intermediate frequency signal, one of said filters tuned to the desired frequency range and the other of said filters tuned to a frequency range which is within the frequency range covered by the intermediate frequency signal and outside of the desired frequency range, a pair of rectifiers connected to respective ones of said band filters, each of said rectifiers having a square law characteristic, a difference forming circuit connected to said rectifiers, a pair of low-pass filters interposed between respective ones of said rectifiers and said difference forming circuit, and a sign evaluating circuit connected to said difference forming circuit operable to provide a signal indicative of phase position in response to the difference in power of said first and second signal portions.

5. Apparatus according to claim 3, comprising a first band filter for receiving the intermediate frequency signal and tuned to the desired frequency range, a modulator including means providing a oscillator signal voltage at a frequency corresponding to a frequency range shifted from the desired frequency range, a second band filter connected to said modulator and tuned to the desired frequency range, a pair of recifiers each having a square law characteristic and connected to respective ones of said first and second filters, a difference forming circuit connected to said rectifiers, a pairs of low-pass filters connected to respective ones of said rectifiers, and a sign evaluation circuit connected to said difference forming circuit and operable to provide a signal indicative of correct phase position when the power of said first portion reaches a predetermined level with respect to the power of said second signal portion.

6. Apparatus according to claim 4, comprising a level adjusting device interposed between the low-pass filter associated with said second signal and said difference forming circuit.

7. Apparatus according to claim 5, comprising a level adjusting device interposed between the low-pass filter associated with said modulator and said difference forming circuit.

8. Apparatus according to claim 4, wherein said low-pass filter associated with said first signal portion includes means for adjusting the band width thereof connected to said sign evaluation circuit for changing the band width thereof from a width that is larger than that of the other low-pass filter to a band width that is essentially the same as that of the low-pass filter in response to the signal which is indicative of correct phase position.

9. Apparatus according to claim 8, comprising an indicating device connected to the transmission path associated with said second signal portion and operable to indicate the noise level with respect to the useful signal level.

10. Apparatus according to claim 9, wherein said indicating device is connected in the transmission path after the rectifier of the transmission path.

11. Apparatus according to claim 10, wherein said indicating device includes a logarithmic indicator for providing a reading in decibels.

* * * * *